(12) United States Patent
Kipman et al.

(10) Patent No.: US 8,009,022 B2
(45) Date of Patent: Aug. 30, 2011

(54) SYSTEMS AND METHODS FOR IMMERSIVE INTERACTION WITH VIRTUAL OBJECTS

(75) Inventors: Alex Kipman, Redmond, WA (US); Kudo Tsunoda, Seattle, WA (US); Todd Eric Holmdahl, Redmond, WA (US); John Clavin, Seattle, WA (US); Kathryn Stone Perez, Shoreline, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/834,723

(22) Filed: Jul. 12, 2010

(65) Prior Publication Data

US 2010/0302015 A1 Dec. 2, 2010

Related U.S. Application Data

(63) Continuation of application No. 12/474,514, filed on May 29, 2009, now abandoned.

(51) Int. Cl.
*H04B 3/36* (2006.01)
(52) U.S. Cl. ............ 340/407.1; 463/30; 463/36; 463/47
(58) Field of Classification Search .................... 463/30, 463/36, 47
See application file for complete search history.

(56) References Cited

U.S. PATENT DOCUMENTS

| | | | |
|---|---|---|---|
| 6,088,020 A * | 7/2000 | Mor | 345/156 |
| 6,256,033 B1 | 7/2001 | Nguyen | |
| 6,278,418 B1 * | 8/2001 | Doi | 345/7 |
| 6,512,838 B1 | 1/2003 | Rafii et al. | |
| 6,539,931 B2 | 4/2003 | Trajkovic et al. | |
| 6,674,877 B1 | 1/2004 | Jojic et al. | |
| 6,705,868 B1 * | 3/2004 | Schleppenbach et al. | 434/114 |
| 6,950,534 B2 | 9/2005 | Cohen et al. | |
| 7,225,115 B2 * | 5/2007 | Jones | 703/7 |
| 7,227,526 B2 | 6/2007 | Hildreth et al. | |

(Continued)

FOREIGN PATENT DOCUMENTS

WO WO 2009/059065 A1 5/2009

OTHER PUBLICATIONS

Hasegawa et al., "Human-Scale Haptic Interaction with a Reactive Virtual Human in a Real-Time Physics Simulator", ACM Computers in Entertainment, vol. 4, No. 3, Jul. 2006, Article 6C.*
Vahora et al., "Development of Real-Time Virtual Reality Haptic Applicantion: Real-Time Issures", 12th IEEE Symposium on Computer-Based Medical Systems, Jun. 20, 1999, Stamford, CT.*

(Continued)

*Primary Examiner* — George Bugg
*Assistant Examiner* — Frederick Ott
(74) *Attorney, Agent, or Firm* — Woodcock Washburn LLP

(57) ABSTRACT

A system to present the user a 3-D virtual environment as well as non-visual sensory feedback for interactions that user makes with virtual objects in that environment is disclosed. In an exemplary embodiment, a system comprising a depth camera that captures user position and movement, a three-dimensional (3-D) display device that presents the user a virtual environment in 3-D and a haptic feedback device provides haptic feedback to the user as he interacts with a virtual object in the virtual environment. As the user moves through his physical space, he is captured by the depth camera. Data from that depth camera is parsed to correlate a user position with a position in the virtual environment. Where the user position or movement causes the user to touch the virtual object, that is determined, and corresponding haptic feedback is provided to the user.

19 Claims, 11 Drawing Sheets

U.S. PATENT DOCUMENTS

| | | |
|---|---|---|
| 7,259,761 B2 | 8/2007 | Shih et al. |
| 7,308,112 B2 | 12/2007 | Fujimura et al. |
| 7,317,836 B2 | 1/2008 | Fujimura et al. |
| 7,367,887 B2 | 5/2008 | Watabe et al. |
| 7,492,367 B2 | 2/2009 | Mahajan et al. |
| 7,590,262 B2 | 9/2009 | Fujimura et al. |
| 7,627,139 B2 | 12/2009 | Marks et al. |
| 7,704,135 B2 | 4/2010 | Harrison, Jr. |
| 2004/0239617 A1 | 12/2004 | Hardwick et al. |
| 2006/0030383 A1* | 2/2006 | Rosenberg et al. ............ 463/1 |
| 2006/0075422 A1 | 4/2006 | Choi et al. |
| 2007/0015128 A1 | 1/2007 | Renaud et al. |
| 2007/0035511 A1 | 2/2007 | Banerjee et al. |
| 2007/0279392 A1 | 12/2007 | Rosenberg et al. |
| 2008/0026838 A1 | 1/2008 | Dunstan et al. |
| 2008/0079752 A1 | 4/2008 | Gates et al. |
| 2008/0094351 A1 | 4/2008 | Nogami et al. |
| 2008/0152191 A1 | 6/2008 | Fujimura et al. |
| 2008/0218514 A1 | 9/2008 | Tarr et al. |
| 2008/0252596 A1 | 10/2008 | Bell et al. |
| 2008/0297535 A1 | 12/2008 | Reinig |
| 2009/0077504 A1 | 3/2009 | Bell et al. |
| 2009/0141933 A1 | 6/2009 | Wagg |
| 2009/0215533 A1 | 8/2009 | Zalewski et al. |
| 2009/0221368 A1 | 9/2009 | Yen et al. |
| 2010/0093435 A1 | 4/2010 | Glaser et al. |

OTHER PUBLICATIONS

Acosta et al., "Real-time Interactions and Synchronization of Voxel-based Collaborative Virtual Environments", IEEE Symposium on 3D User Interfaces, Mar. 11, 2007, Charlotte, NC.*

Boukerche et al., "A Prediction Algorithm for Haptic Collabortion", HAVE 2005, Oct. 2, 2005, Ottawa, Canada.*

Balcisoy et al., "Interaction Techniques with Virtual Humans in Mixed Environments", 5th IEEE EMBS International Summer School on Biomedical Imaging, Jun. 15-23, 2002, 6 pages.

Bowman et al., "3D User Interfaces: New Directions and New Perspectives", IEEE Computer Graphics and Applications, Nov.-Dec. 2008, 28(6), 1-19.

Cha et al., "A Framework for Haptic Broadcasting", IEEE MultiMedia, Jul.-Sep. 2009, 16(3), 1-27.

Fruhlinger, "Airborne Ultrasound Tactile Display Creates haptic 3D Objects you can Poke", http--www.engadget.com-2008-09-03-airborne-ultrasound-tactile-display-creates-haptic-3d-objects-yo-, posted Sep. 3, 2008, 21 pages.

Qian et al., "A Gesture-Driven Multi-modal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Steinicke et al., "The Holodeck Construction Manual", Poster Presentation at ACM SIGGRAPH08 (Conference DVD), 2008, 1-2.

* cited by examiner

SYSTEMS AND METHODS FOR IMMERSIVE INTERACTION WITH VIRTUAL OBJECTS

CROSS REFERENCE TO RELATED APPLICATIONS

This application is a continuation of patent application Ser. No. 12/474,514 filed on May 29, 2009, titled "Systems and Methods for Immersive Interaction with Virtual Objects," the entire contents of which is incorporated herein by reference.

BACKGROUND

Many computing applications endeavor to provide immersive experiences for users. This may include presenting a virtual environment to the user, where virtual objects within that virtual environment can be manipulated by the user. However, the user has little sensory connection to those virtual environments beyond what is presented visually, and this hinders a truly immersive experience.

SUMMARY

It would therefore be an improvement to provide a user with a more immersive experience. In an exemplary embodiment, a system comprising a depth camera that captures user position and movement, a three-dimensional (3-D) display device that presents the user a virtual environment in 3-D and a haptic feedback device—technology that interfaces to the user via the sense of touch by applying, for instance, forces, vibrations and/or motions to the user—provides haptic feedback to the user as he interacts with a virtual object in the virtual environment. As the user moves through his physical space, he is captured by the depth camera. Data from that depth camera is parsed to correlate a user position with a position in the virtual environment. Where the user position or movement causes the user to touch the virtual object, that is determined, and corresponding haptic feedback is provided to the user.

For example, haptic feedback may be provided through use of a glove coupled to the user's arm, the glove containing a plurality of electrodes that may provide a mild electrical stimulation to the user. When the user makes a movement in his physical environment that corresponds to grasping a virtual cylinder, the system may determine that this has occurred, and provide haptic feedback to the palm and fingers of the user that provides a similar haptic experience for the user as if he had grasped a physical cylinder in his physical space.

BRIEF DESCRIPTION OF THE DRAWINGS

The systems, methods, and computer readable media for gesture coaching, in accordance with this specification, are further described with reference to the accompanying drawings in which.

DETAILED DESCRIPTION OF ILLUSTRATIVE EMBODIMENTS

Figure 1A:
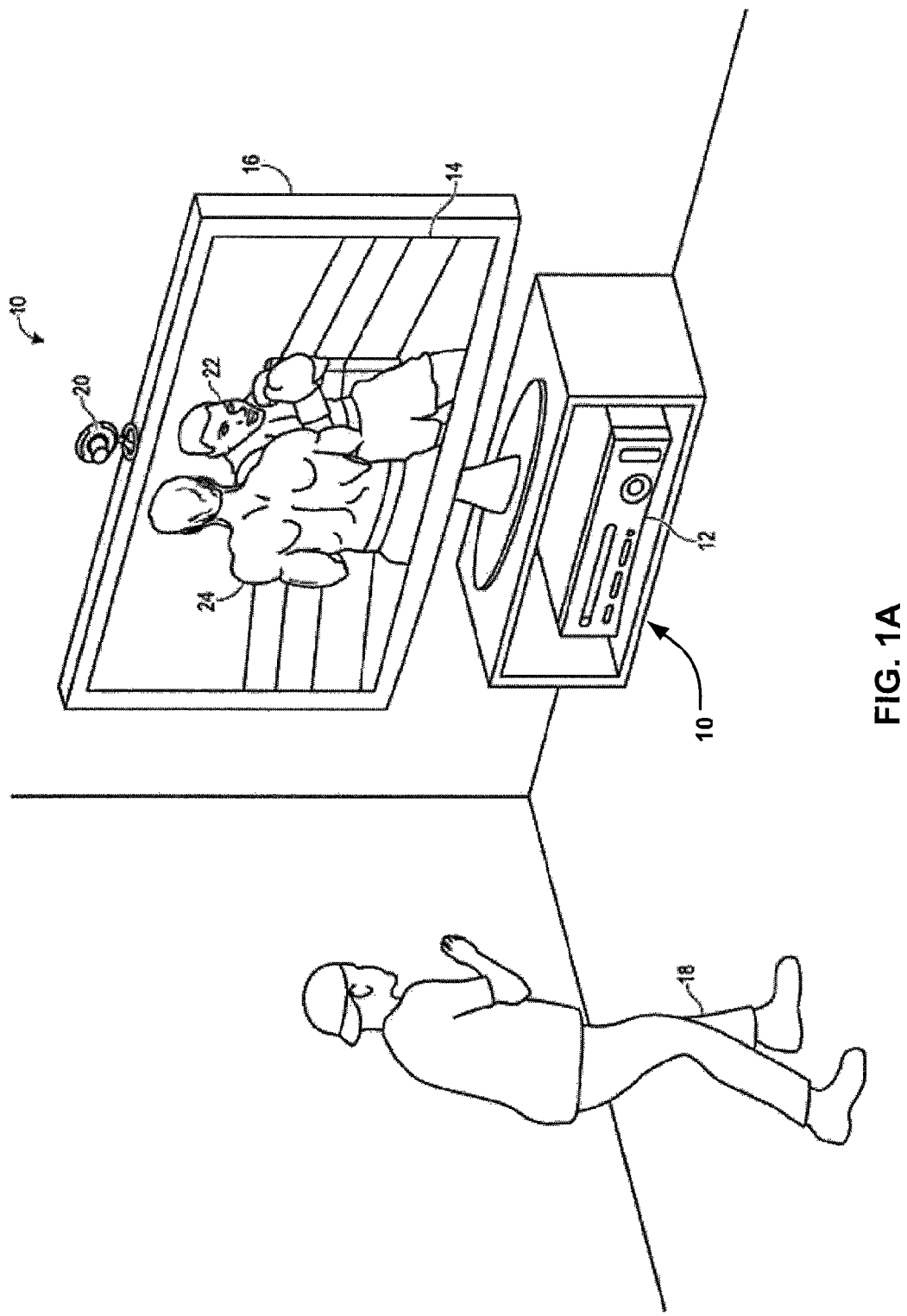
FIGS. 1A and 1B illustrate an example embodiment of a target recognition, analysis, and tracking system with a user playing a game.

As will be described herein, a user may interact with a virtual environment of an application executing on a computing environment such as a game console, a computer, or the like by performing one or more gestures or movements. Disclosed herein are systems and methods for providing non-visual sensory feedback to the user. For example, the computing environment may provide the user with haptic feedback where his body position corresponds to touching a virtual object in the virtual environment.

To generate models representative of a target or object in a physical space, a capture device can capture a depth image of the physical space and scan targets in the scene. A target may include humans or other objects in the scene. In one embodiment, the capture device may determine whether one or more targets in the scene corresponds to a human target such as the user. To determine whether a target in the scene corresponds to a human target, each of the targets may be flood filled and compared to a pattern of a human body model. A target identified as a human may be scanned to generate a skeletal model associated therewith. The skeletal model may then be provided to a computing environment for tracking the skeletal model and rendering an avatar associated with the skeletal model. The computing environment may map the motions of the user in the physical space to a visual representation on a display device, such as an avatar. The computing environment may determine which controls to perform in an application executing on the computer environment based on, for example, gestures of the user that have been recognized and mapped to the skeletal model.

Some of the functional units described in this specification have been labeled as components, in order to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like.

Components may also be implemented in software for execution by various types of processors. An identified component of executable code may, for instance, comprise one or more physical or logical blocks of computer instructions which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

The system, methods, and components of providing non-visual sensory feedback as described herein may be embodied in target recognition, analysis, and tracking system implemented in a multi-media console, such as a gaming console, or in any other computing device in which it is desired to provide visual assistance, by way of example and without any intended limitation, satellite receivers, set top boxes, arcade games, personal computers (PCs), portable telephones, personal digital assistants (PDAs), and other hand-held devices.

Figure 1B:
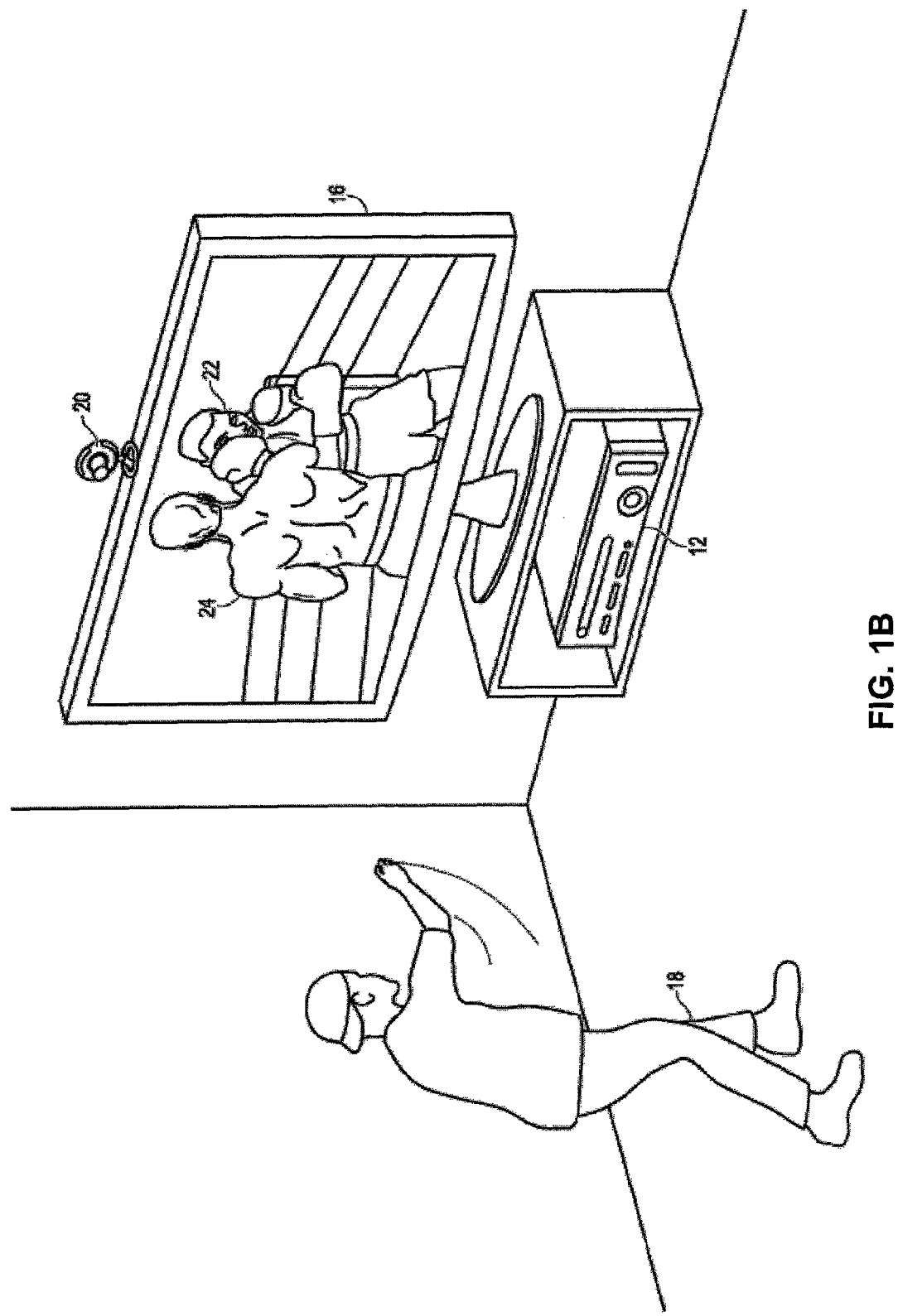

FIGS. 1A and 1B illustrate an example embodiment of a configuration of a target recognition, analysis, and tracking system 10 in which the system, methods, and components described herein for providing non-visual sensory feedback may be embodied. In the example shown, a user 18 is playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

The audiovisual device may comprise a three-dimensional (3-D) display device. Such a 3-D display device may use any of a variety of techniques to produce a 3-D image, such anaglyph images, the eclipse method, polarization filters, lenticular or barrier screens, autostereoscopic methods, and stereoscopic viewing devices. Some of these techniques, such as using anaglyph images, are effected through the user wearing special glasses. Other of these techniques, like the eclipse method, may be implemented without requiring of the user to wear glasses. In some embodiments, where techniques are used that rely on alternating images on the display device to produce a 3-D effect, the display device may refresh at a higher rate than the conventional 50 or 60 Hz, such as 100 or 120 Hz.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 24. For example, the player may use movements to end, pause, or save a game, select a level, view high scores, communicate with a friend, etc.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
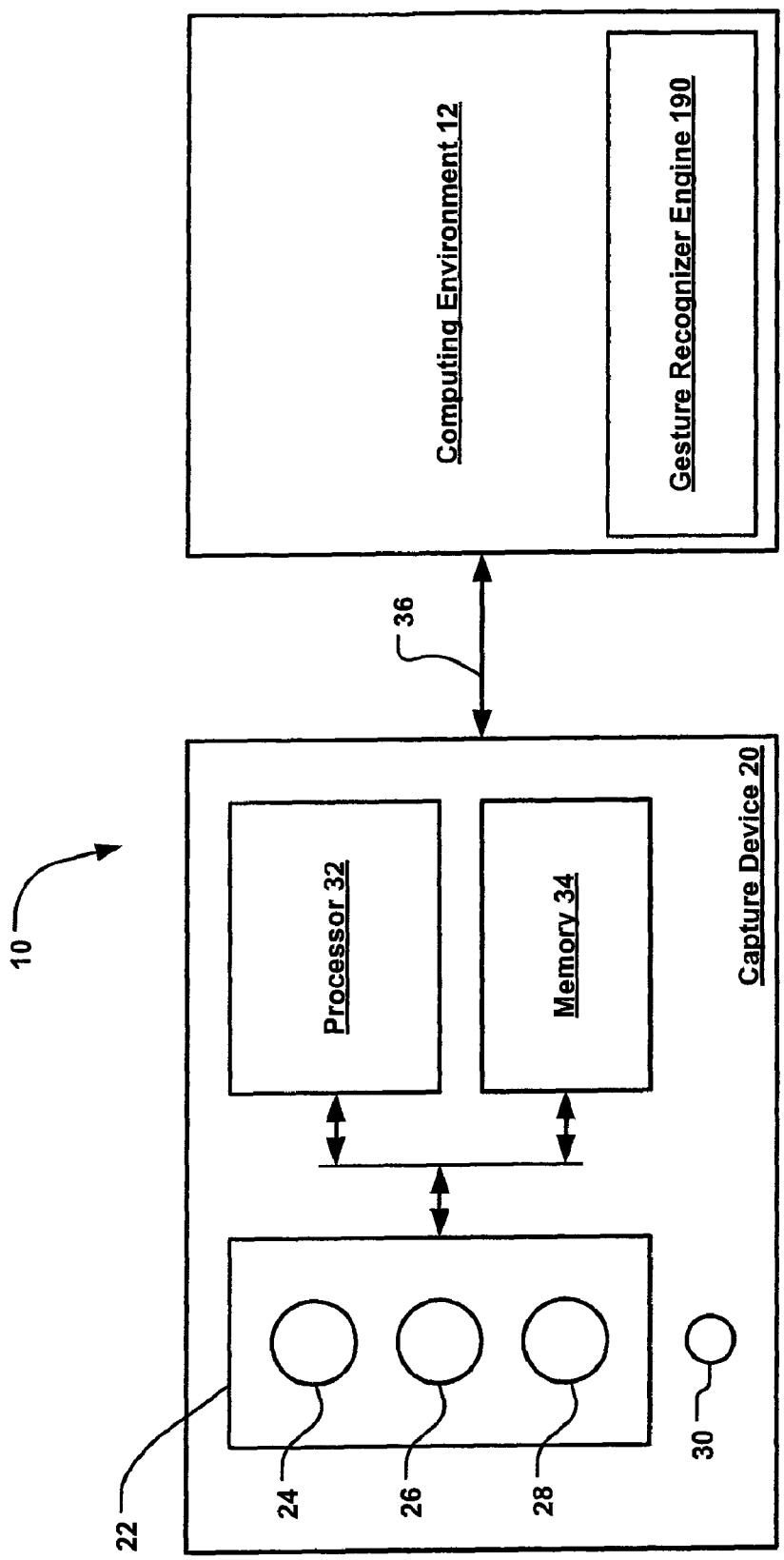
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, recognize user gestures and in response control an application such as a game or word processor. For example, as shown, in FIG. 2, the computing environment 12 may include a gestures recognizer engine 190. The gestures recognizer engine 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognizer engine 190 to identify when a user (as represented by the skeletal model) has performed one or more gestures. Those gestures may be associated with various controls of an application. Thus, the computing environment 12 may use the gesture recognizer engine 190 to interpret movements of the skeletal model and to control an application based on the movements.

Figure 3A:
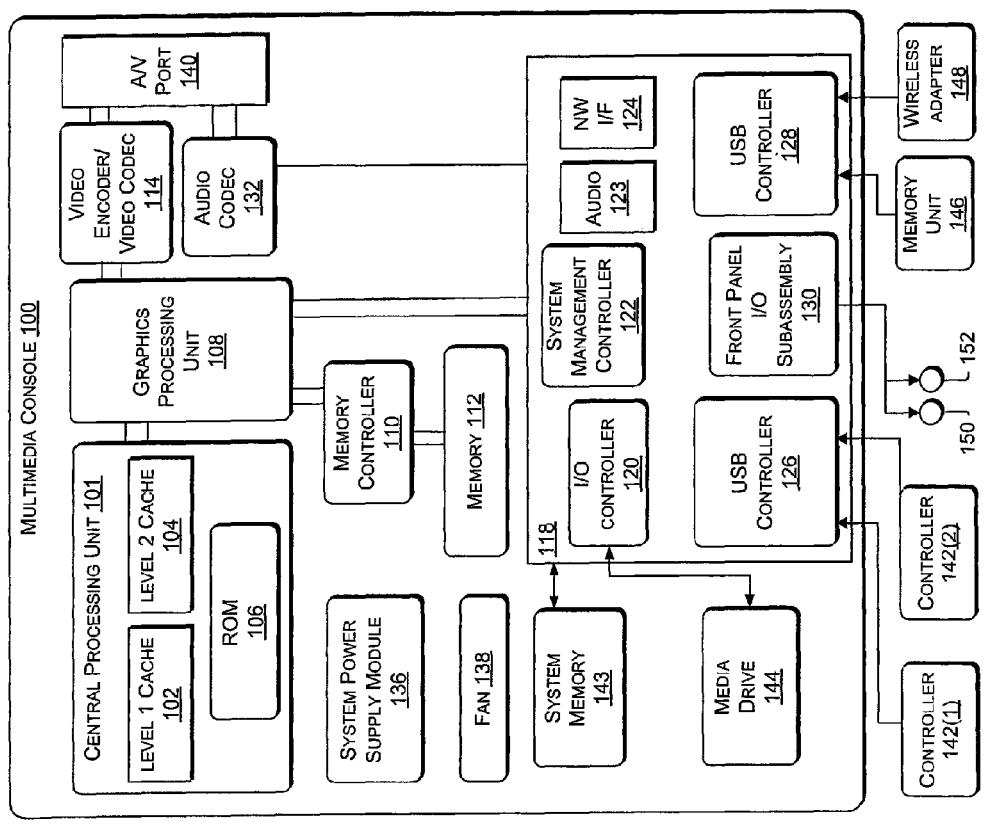
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 3B:
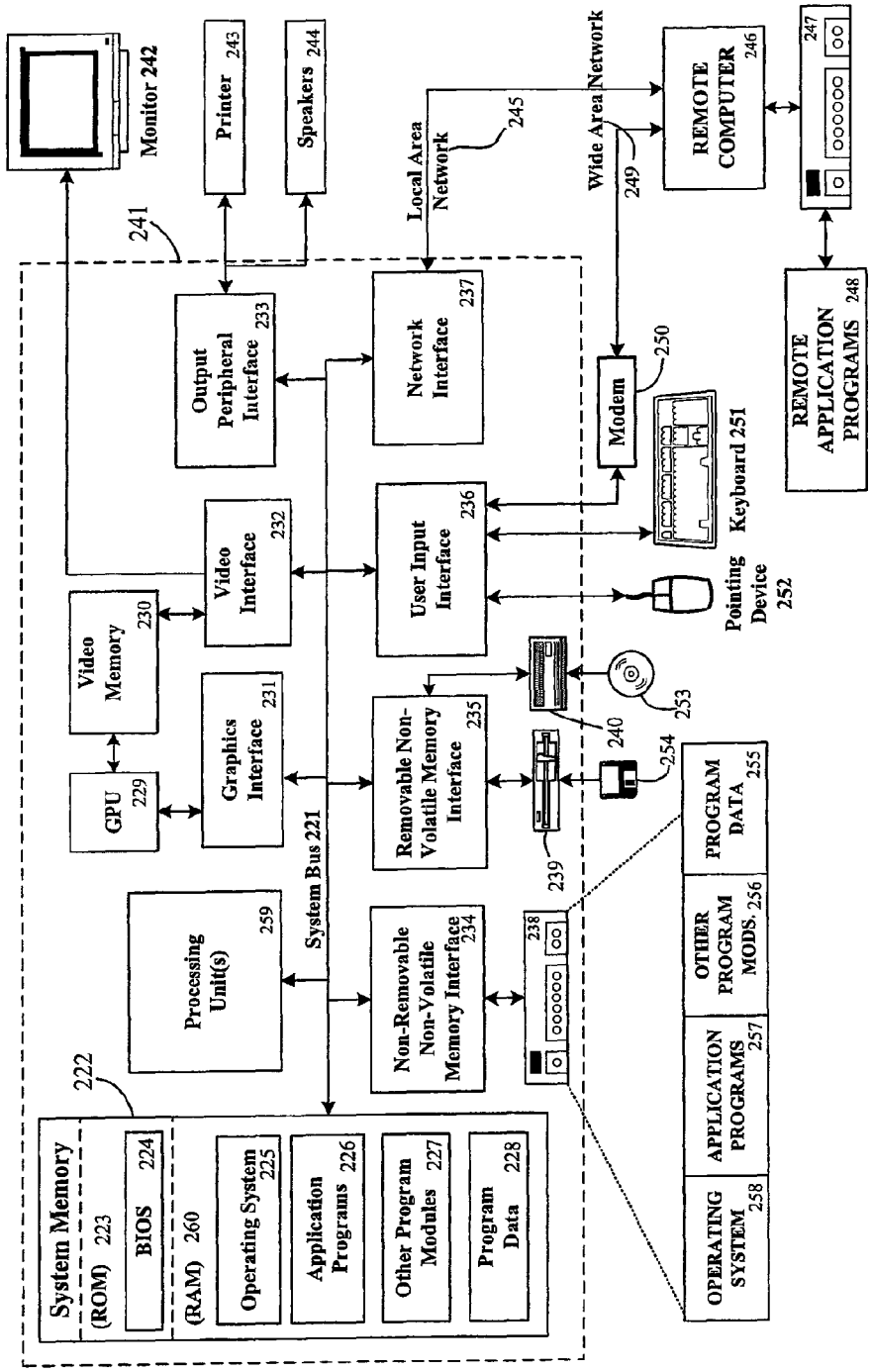
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since the state of the art has evolved to a point where there is little difference between hardware, software, or a combination of hardware/software, the selection of hardware versus software to effectuate specific functions is a design choice left to an implementer. More specifically, a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4A:
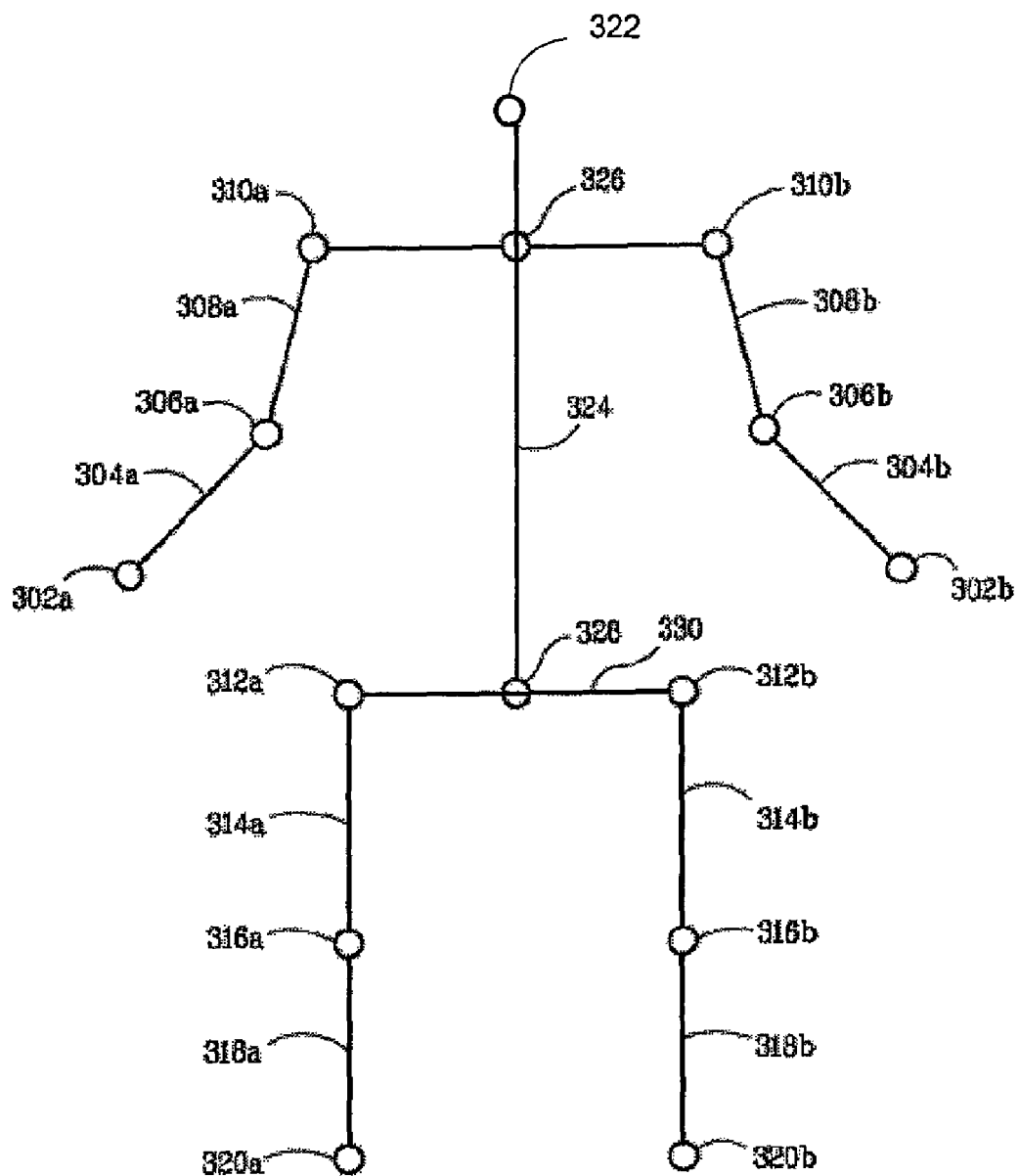
FIG. 4A illustrates a skeletal mapping of a user that has been generated from the target recognition, analysis, and tracking system of FIG. 2.

FIG. 4A depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and bottom 328 of the spine, and the waist 330. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning A gesture may be dynamic, comprising a motion, such as mimicking throwing a ball. A gesture may be a static pose, such as holding one's crossed forearms 304 in front of his torso 324. A gesture may also incorporate props, such as by swinging a mock sword. A gesture may comprise more than one body part, such as clapping the hands 302 together, or a subtler motion, such as pursing one's lips.

Gestures may be used for input in a general computing context. For instance, various motions of the hands 302 or other body parts may correspond to common system wide tasks such as navigate up or down in a hierarchical list, open a file, close a file, and save a file. Gestures may also be used in a video-game-specific context, depending on the game. For instance, with a driving game, various motions of the hands 302 and feet 320 may correspond to steering a vehicle in a direction, shifting gears, accelerating, and breaking.

A user may generate a gesture that corresponds to walking or running, by walking or running in place himself. The user may alternately lift and drop each leg 312-320 to mimic walking without moving. The system may parse this gesture by analyzing each hip 312 and each thigh 314. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

In addition to gestures, this skeletal mapping of a user may be used to identify a user's body orientation and/or position within a scene. For example, it may be determined that the user has raised both his hands over his head without assigning that body orientation to a gesture. Where the size of the user's bones grow over time in the scene, it may be determined that the user's position has moved closer to the camera. From this information, the user's location and shape within a scene may be determined, and in an embodiment, this may be used to associate the user's physical position with a corresponding virtual environment with which the user is interacting.

User position, movement and gestures may be parsed through means other than by this above skeletal tracking, such as by producing a wire-frame representation of the user, or by generating a model of the user by grouping together those contiguous parts of the image that share similar distance values, color values, or some combination thereof.

Figures 5A, 5B:
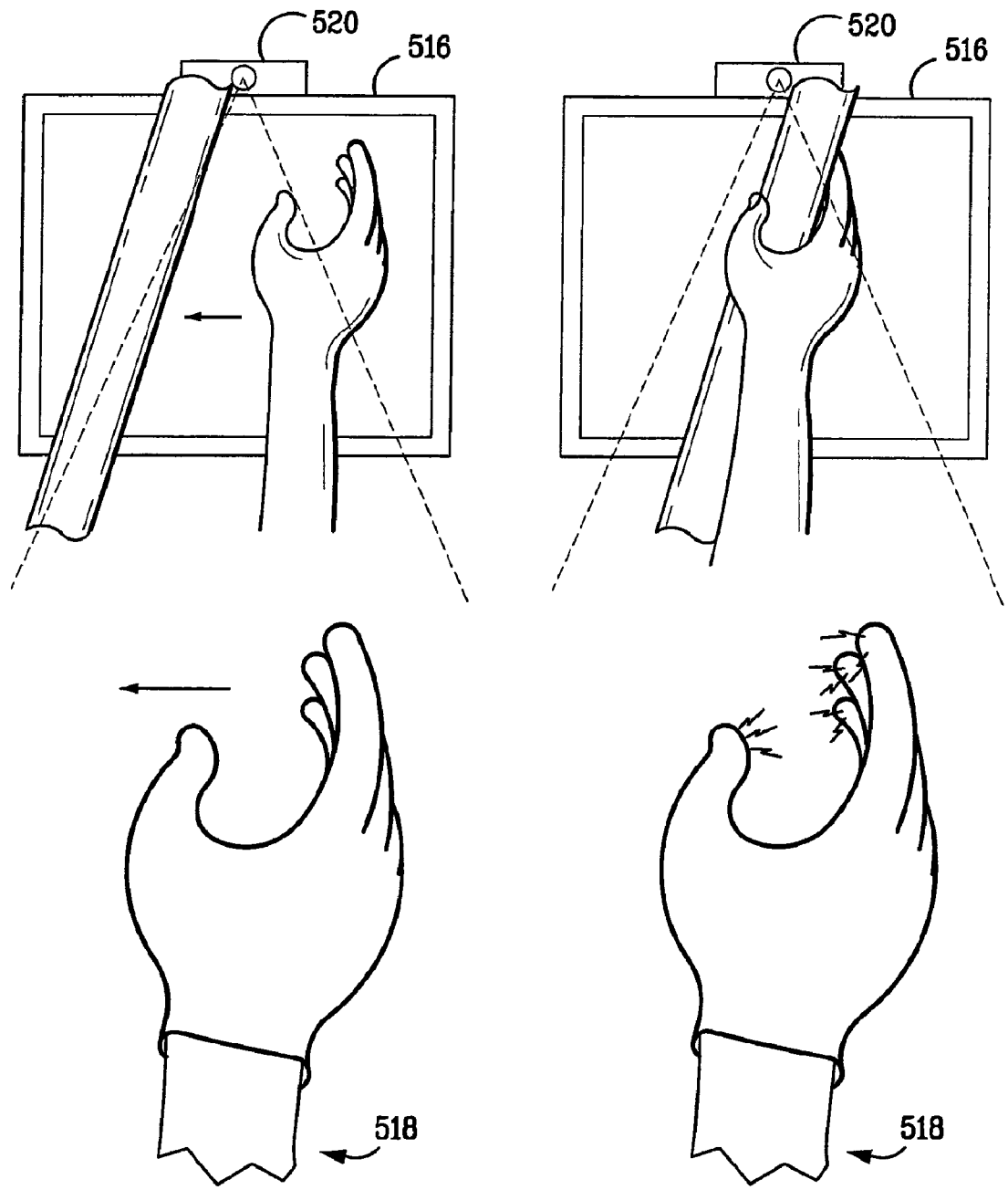
FIGS. 5A and 5B illustrate a user receiving non-visual sensory feedback while interacting with a 3-D environment and being captured by a target recognition, analysis, and tracking system.

FIGS. 5A and 5B illustrate a user receiving non-visual sensory feedback while interacting with a 3-D environment and being captured by a target recognition, analysis, and tracking system. In FIG. 5A, capture device 520 captures user 518 and display device 516 produces a 3-D display for user 518, including a virtual baton that is projected into the user's physical space. User 518 wears a haptic feedback device on his right hand. In an embodiment, this haptic feedback device comprises a plurality of electrodes, each electrode configured to provide haptic feedback to a different part of the user's hand. In such an embodiment, each electrode may be thought of as a haptic feedback sub-device, in that each electrode may independently provide haptic feedback to a location of the user. Thus, as the number of haptic feedback sub-devices is increased, the granularity of haptic feedback that may be provided to a user is refined.

The haptic feedback device may be wired to computing environment 12 or communicate with computing environment 12 through a wireless communications protocol across a communications network. As the user is not interacting with a virtual object, he is receiving no haptic feedback.

In FIG. 5B, the user 518 has moved his hand to his left and gripped the area in which the virtual baton is projected with his fingers. Capture device 520 captures the position of the user's hand. In an embodiment, this data is processed by computing environment 12 to determine where in physical space the user's hand is located. A location may be a place on the surface of the user that may receive haptic feedback. A user may have multiple locations—for instance one or more for each fingertip. Computing environment 12 may also have access to the projected position in physical space of the virtual baton by virtue of having instructed display device 516 to display the virtual baton at that location. Knowing these two locations, computing environment 12 may determine which locations of the user's hand are touching the baton and instruct the haptic feedback device to provide haptic feedback at those locations.

In an embodiment, this haptic feedback corresponds to the type of interaction between the user and the virtual device. In an embodiment, more haptic feedback is provided to user 518 when user 518 attempts to grip the virtual baton more tightly.

There exist other types of non-visual sensory feedback, and where the non-visual sensory feedback comprises haptic feedback, other types of haptic feedback devices.

In an embodiment where the non-visual sensory feedback comprises haptic feedback, the haptic feedback device may be one such as a device physically coupled to at least one location of the user, such as one that uses a plurality of electrodes to provide haptic feedback through electrical stimulation, a device that emits at least one ultrasonic wave at least one location of the user, or a device that emits at least one stream of air at least one location of the user.

In an embodiment, the haptic feedback corresponds to Braille. In an embodiment where the user has at least six locations on at least one finger, Braille may be simulated through the haptic feedback. Each location may then correspond to a dot in the Braille pattern, and a Braille encoding of a character may be indicated to the user through the appropriate combination of haptic feedback at the locations. Similar systems of haptic communication may be implemented using more or fewer locations on the fingers or other parts of the user's body, depending on the particulars of the specific form of communication.

In an embodiment, non-visual sensory feedback comprises olfactory feedback. This may be effectuated through a device that contains at least one scent, and where it has a plurality of scents, it may combine those available scents to produce more complex, compound scents. In an embodiment, this device emits the scent to the general area in which the user is physically located. In an embodiment, this device directs the scent toward a particular placement of the user, such as by blowing it with a fan. In an embodiment, the user has a device coupled to his nose from which the scent is emitted.

In an embodiment, the non-visual sensory feedback comprises audio feedback. This may be effectuated through a plurality of speakers arranged in the user's physical location, such as a stereo, 2.1, 5.1, 6.1, 7.1 or similar sound system. Some or all of these speakers may be directional, such that they send sound to a specific location and that sound cannot be heard from other locations. The location may be the user's ear or ears, such that the speaker system may identify the user's ears and then send directional sound to that user, so that another user cannot hear it. Where the specific location is the user, the directed audio may be considered to be centered on the user or substantially centered on the user. Where a plurality of speakers is used, as per above, this may be accomplished by appropriate adjustment of the sound field of the plurality of speakers.

In an embodiment, at least one speaker may be rotated by the speaker horizontally and/or vertically, such as by a mechanical device coupled to the speaker. Whereas a speaker in a fixed position may be capable only of outputting audio in a single direction, such a rotate-able speaker may output audio in a variety of directions. Where the speaker is rotate-able, audio may be output over a narrower direction and still reach the user. Where the audio is output in a sufficiently narrow direction, and it is directed at the user, the user will be able to understand the audio (be it speech or other sound), while any additional users present will either not be able to hear the audio, or if they can hear that it is occurring, not be able to hear it sufficiently loud as to understand it. This may be thought of as a "whisper" in that a subset of the present users can understand the audio.

Figure 6A:
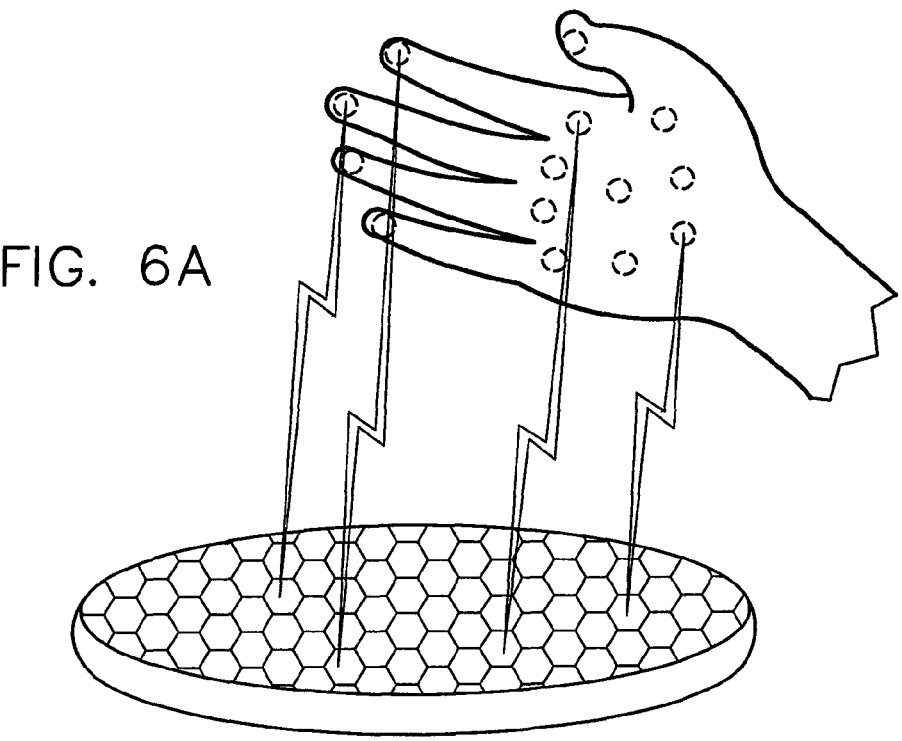
FIG. 6A illustrates a user receiving haptic feedback from an ultrasonic haptic feedback system.

FIG. 6A illustrates a user 18 receiving haptic feedback from an ultrasonic haptic feedback system. In an embodiment, the ultrasonic haptic feedback system comprises a plurality of ultrasonic haptic feedback emitters, each emitter configured to independently provide an amount and/or type of haptic feedback to a place in its neighboring physical space. Through emitting appropriate ultrasonic waves at one or more locations of the user, the user may receive haptic feedback from these waves that simulate interaction with a virtual object.

In an embodiment, this haptic feedback device is physically located in a position known to computing environment 12. In an embodiment, image data of the haptic feedback device is captured by capture device 12, and its position in physical space is determined from this image data. With the physical position of the haptic feedback device and the physical position of the user known, computing device 12 may instruct the haptic feedback device to emit haptic feedback from a haptic feedback emitter known to correspond to the intended recipient location of the user. As the user moves through physical space, the location of the user that may receive haptic feedback may move as well relative to the haptic feedback device. Thus, as the user moves, this movement may be determined by capture device 12, and capture device 12 may instruct the haptic feedback device to emit haptic feedback from different haptic feedback emitters over time, as those haptic feedback emitters correspond to the location of the user as he moves.

Figure 6B:
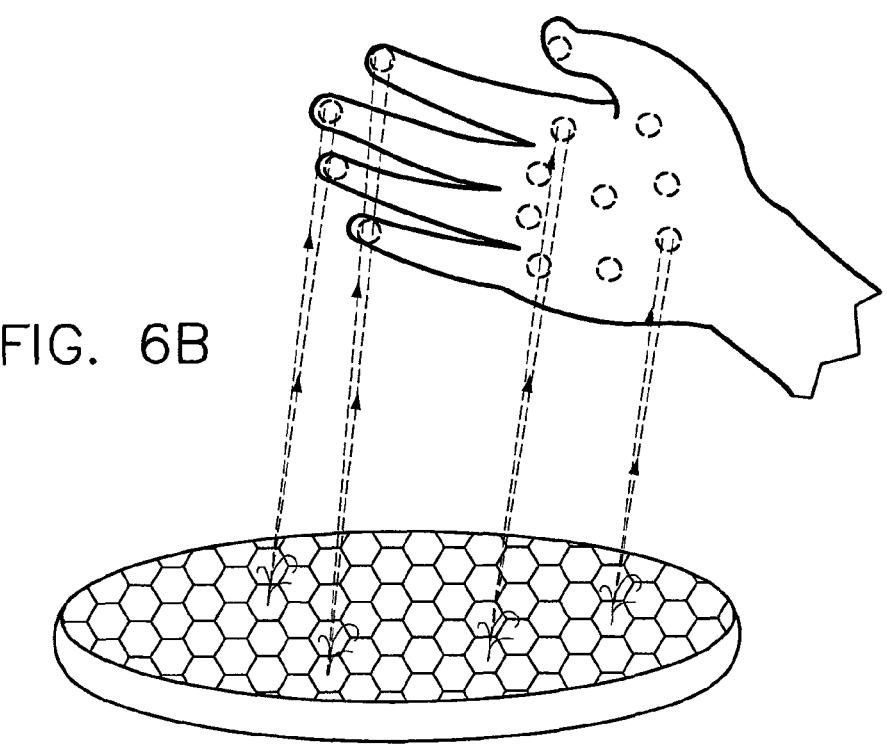
FIG. 6B illustrates a user receiving haptic feedback from an air-burst-based haptic feedback system.

FIG. 6B illustrates a user receiving haptic feedback from an air-power-based haptic feedback system. In an embodiment, the air-powered-based haptic feedback system comprises a plurality of air emitters, each emitter configured to independently provide a strength and/or duration of haptic feedback to a place in its neighboring physical space by emitting a burst of air to that space.

Figure 7:
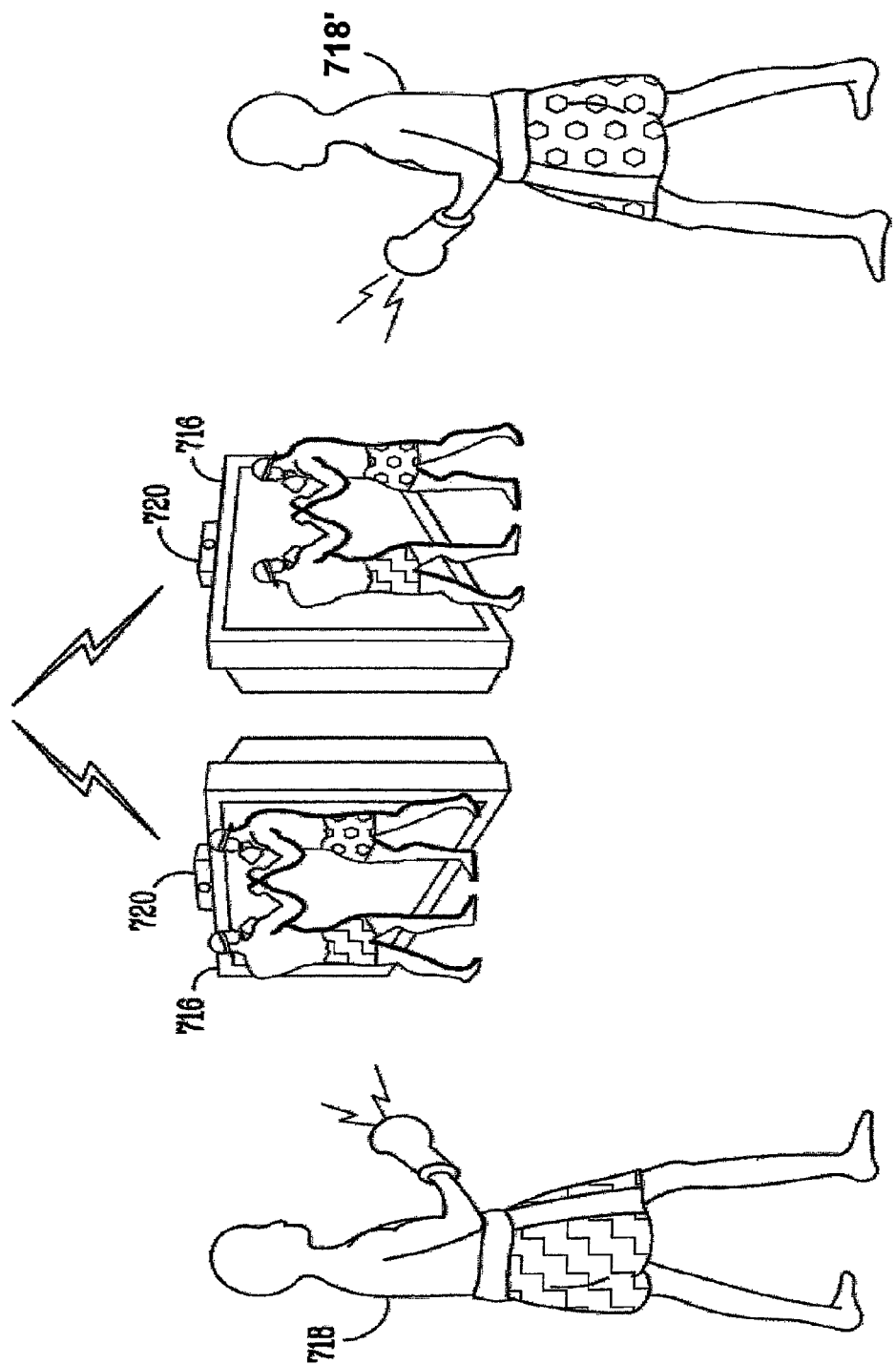
FIG. 7 illustrates two users interacting across a communications network, each receiving complimentary haptic feedback.

FIG. 7 illustrates two users interacting across a communications network, each receiving complimentary haptic feedback.

User 718 and user 718' may communicate through respective computing environments 12 across a communications network. Each user may further be captured by a separate capture device 20, and receive visual input from a separate display device 716. In an embodiment, a user has a displayed avatar. In an embodiment, the virtual environment is projected into the user's physical space and he interacts with it directly, such as by moving his body to the position where virtual objects in the virtual environment are projected by display device 716.

In this example, users 718 and 718' are participating in a boxing game remotely. When users 718 and 718' touch fists with each other, each receives haptic feedback corresponding to that touch. In an embodiment, the same amount of haptic feedback is provided to each user 718. In an embodiment, the amount of haptic feedback provided to each user 718 is scaled based on a characteristic of the user. For example, the amount of haptic feedback may be scaled based on the user's strength, ability or some other characteristic. For example, in FIG. 7, if user 718's character is significantly stronger than user 718', user 718' may receive a fraction of the haptic feedback received by user 718 when the two users interact with each other.

Figure 8:
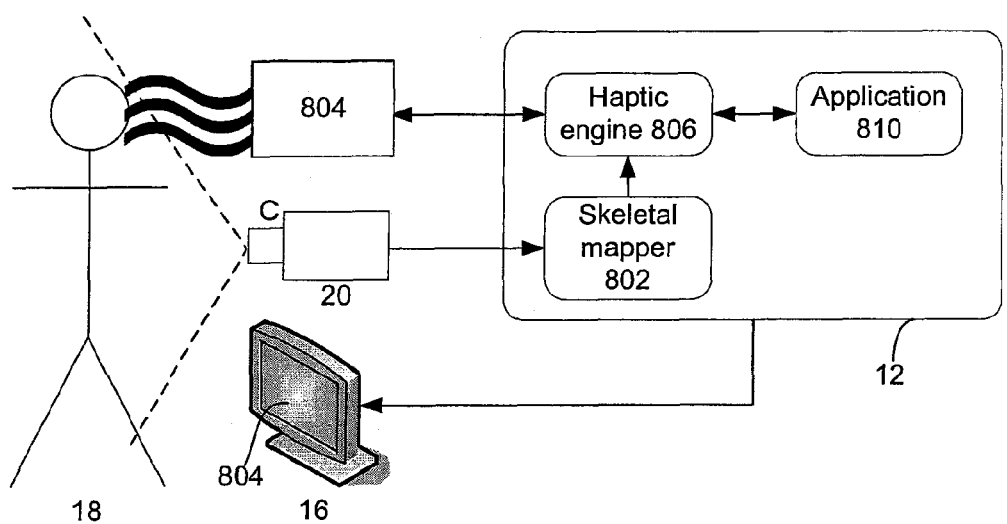
FIG. 8 illustrates a block diagram illustrating another embodiment of the system 10 of FIG. 2, in which haptic feedback device 804 has been added to support the haptic feedback functionality described above.

FIG. 8 illustrates a block diagram illustrating another embodiment of the system 10 of FIG. 2, in which haptic feedback device 804 has been added to support the haptic feedback functionality described above. The user 18 is presented with one or more virtual objects on display device 16. His motions are captured in images by capture device 20. In an embodiment, the image data is sent to computing environment 12 and received by skeletal mapper 802, which determines a skeletal mapping of the user. In other embodiments, all or part of this mapping is performed by capture device 20. In other embodiments, other identifying techniques, such as wire-frame mapping, are used instead of, or to complement, skeletal mapping.

That map information is then used to locate the user in his physical space and correlate that to a virtual space in which the virtual object is presented 804. Where it is determined that an interaction occurs, an indication of this is sent to the haptic engine 806.

In an embodiment, haptic engine 806 also receives a characteristic or quality of the indication, such as which of one or more locations on the user correspond to the interaction, and the nature of the interaction (e.g. light touch, hard touch). It may receive further characteristic or quality information such as a prediction of how long the touch may last and how it may change over time.

In an embodiment, a characteristic of user interaction may be a strength of the user, a velocity of the virtual object or the user, a mass of the virtual object or the user, a material of the virtual object, or a task being completed, and this may be used to determine a quality of haptic feedback, such as the amount of force to generate. Where the user is very strong, a higher level of haptic feedback may be provided to him so that he subjectively feels that the feedback is strong. The velocity of the virtual object may change a quality of the user interaction. If the user is catching a virtual ball thrown at a high of velocity, the corresponding feedback may be stronger than if the user is catching that virtual ball thrown at a lower velocity. Likewise, a mass of the virtual object may change a quality of the user interaction. Where the user is catching that virtual ball, the corresponding feedback may be greater when the ball has a greater mass than when it has a lesser mass.

The quality of user interaction may correspond to a material of the virtual object. Where the virtual object is a ball and the virtual object corresponds to a relatively inelastic material, such as metal, the feedback given to the user may be uniformly high from the moment at which the interaction takes place. Where the virtual ball corresponds to an elastic material, such as soft rubber, the feedback given to the user may be slight at first, corresponding to the compression of the rubber upon initial contact, then increase to correspond the elastic response of the material after it has reached its peak compression.

The quality of user interaction may correspond to a task being completed. Haptic feedback may be beneficial to indicate to a user how he has progressed through a task. In an embodiment, virtual objects comprise files and folders on a virtual computer desktop, and the user wishes to put a particular file in the trash. When the user has dragged that file to the trash and it has been placed there, the user may receive haptic feedback, such as a slight rumble or shock in the hand that he used to drag, to indicate that the task has been completed.

In an embodiment, determining that the location of the user corresponds to interacting with a virtual object includes determining that a future location of the user is likely to correspond to interacting with the virtual object, and providing feedback to the user at the future location of the user. This form of predictive non-visual sensory feedback aids in reducing latency between when an event that gives rise to feedback occurs, and when the feedback is received by the user.

Interaction may be predicted by using past data to predict future changes in the tracked user data. Such data may include body part position, velocity, acceleration or rotation, or any other data received from a capture device, such as movement of a physical object, an input to a mouse or controller, or audio signals. In an embodiment, this past data comprises data where the user made an interaction occur. Where at some point in making that interaction, the user had a given velocity, acceleration or rotation of one or more body parts, and the user has a similar velocity, acceleration or rotation of that body part or body parts here as measured by the current data, it may be determined that it is highly probable that the user is going to cause the same or a similar interaction, and appropriate feedback may be given to the user.

In an embodiment, a current position, velocity, acceleration or rotation of one or more body parts of the user is used to predict whether and/or what interaction the user may cause. For example, if the user is accelerating his hand toward the front of his body, but has not yet brought it far enough forward to come into contact with a virtual object, it may be predicted that this acceleration of the hand will continue until the user has made this contact interaction, and appropriate feedback may be provided to correspond to the time when the user does contact.

Feedback may be predicatively provided by using knowledge of human anatomy to predict future body part position, velocity, acceleration or rotation. For instance, a forearm is limited in the degree that it may rotate, and most people cannot create an angle in excess of 180 degrees in their elbow. Additionally, where the right hand starts moving forward at a rapid rate, it is likely that the right elbow and shoulder will soon begin moving forward as well, since those body parts are all closely physically connected. In an embodiment, these characteristics of anatomy are used to predict that feedback should be provided.

That information is received by the haptic feedback engine 806, which sends the haptic feedback device 804 indications on the characteristics of haptic feedback to issue to the user (e.g. amount, type and location(s)).

For instance, where the haptic feedback device comprises a plurality of haptic feedback sub-devices, where each sub-device is able to send haptic feedback to the user, a subset of these sub-devices may be instructed to provide haptic feedback to the user. These may correspond to those locations of the user that are to receive haptic feedback. For instance, where only the fingers of the user's hand (but not the entire hand) are to receive feedback, only those sub-devices that correspond to the fingers may provide the feedback.

In an embodiment, haptic feedback device 808 is configured to determine characteristics of the user's interaction with it and send data corresponding to that to haptic engine 806. For instance, where the haptic feedback device is physically coupled to the user, the device 804 may also be able to determine an amount of force exerted on it by the user or a distance the user moves, and convey that to haptic feedback engine 806. The engine 806 may use this information to alter the haptic feedback provided to the user. For instance, where the user is able to exert a great force, the amount of haptic feedback may be increased. Likewise, if the system intends to output a great amount of haptic feedback such that the user has difficulty moving, and the user is still able to move freely, the force of the haptic feedback may be increased.

In an embodiment, haptic engine 806 communicates with application 810 to determine the amount and/or type of haptic feedback to be given by haptic feedback device 804. In an embodiment, haptic engine 806 transmits information pertaining to the interaction to application 810. Application 810 determines the amount and/or type of haptic feedback to provide to the user, and transmits that to haptic engine 806. Haptic engine 806 then sends haptic feedback device 810 indications that cause it to provide such haptic feedback to user 18. It should be appreciated that the components of this system architecture are arranged logically, and that one or more functions of a component may be implemented in another component.

Figure 9:
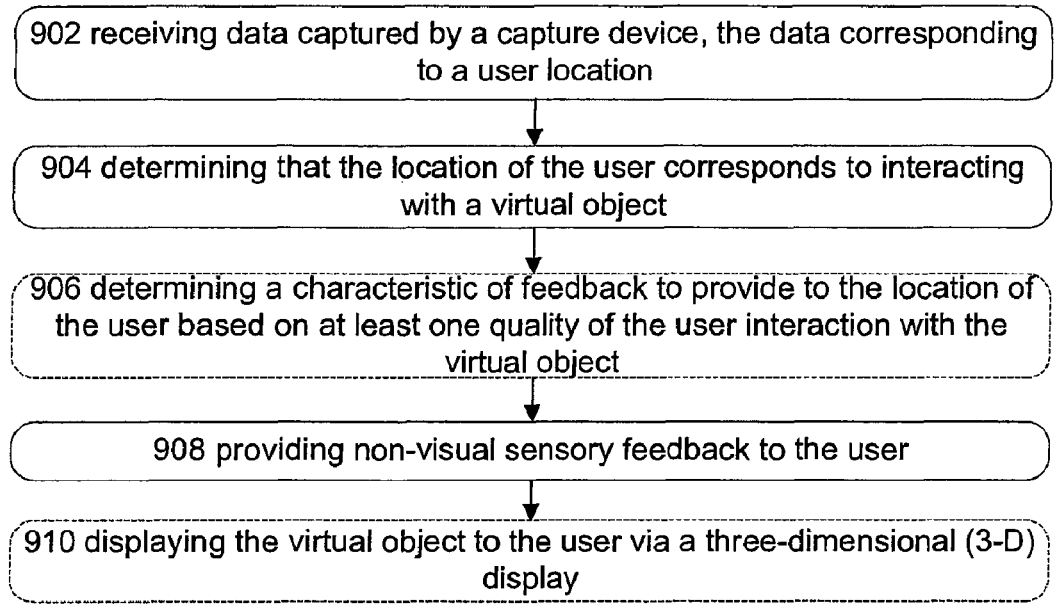
FIG. 9 illustrates exemplary operational procedures for immersive virtual object interaction.

FIG. 9 illustrates exemplary operational procedures for immersive virtual object interaction.

Operation 902 depicts receiving data captured by a capture device, the data corresponding to a user location. The capture device may capture a scene that contains all of the user, such as from the floor to the ceiling and to the wall on each side of a room at the distance in which the user is located. The capture device may also capture a scene that contains only part of the user, such as the user from the abdomen up as he or she sits at a desk. The capture device may also capture an object controlled by the user, such as a prop camera that the user holds in his or her hand.

Operation 904 depicts determining that the location of the user corresponds to interacting with a virtual object.

A location of the user may be the entire user, some sub-part of the user, like his right hand, his right index finger, or the tip of his right index finger. The granularity may be as fine as is a desired area to present feedback. For instance, in considering the user's hand, the hand may comprise a plurality of locations, each with a square area of no more than several millimeters. Where a plurality of locations are used, a different amount of feedback may be given to each location to more accurately simulate interaction with a virtual object.

For instance, where the virtual object is a baseball gripped by the user, more significant haptic feedback may be given to those user locations where the seams of the virtual baseball would dig into the user's skin, less significant feedback may be given to those user locations that more lightly touch the smooth surface of the baseball, and no feedback may be given to those user locations that do not touch the baseball.

In an embodiment where the virtual object is displayed in 3-D by a 3-D display device, the virtual object is displayed in the physical space of the user. In such an embodiment, a mapping may be maintained between a location of the virtual object and its corresponding location in physical space. It may then be determined that the location of the user corresponds to interacting with a virtual object when the location of the user touches or intersects the physical location associated with the virtual object.

In an embodiment, the location of the user corresponds to a representation on a display device and the virtual object is displayed on the display device. The user may be thought of as having an avatar displayed on the display device, or other representation on that device directly controlled by him, such as a baseball bat or a gun. In such an embodiment, a map of the virtual environment in which both the virtual object and the user avatar or user-controlled object exist may be maintained. It may then be determined that the location of the user corresponds to interacting with a virtual object when the user avatar or user-controlled object then touches or intersects with the virtual object.

A user may interact with a virtual object in a variety of ways. He may touch it, push it, pull it, grab it, lift it, throw it, spin it, drop it, or perform any one of a number of actions to it that correspond to what how the user may interact with a physical version of that virtual object.

Optional operation 906 depicts determining a characteristic of feedback to provide to the location of the user based on at least one quality of the user interaction with the virtual object.

Operation 908 depicts providing non-visual sensory feedback to the user.

In an embodiment, the non-visual sensory feedback comprises one of haptic feedback, olfactory feedback and audio feedback as previously discussed.

In an embodiment, an amount of non-visual sensory feedback is provided to the user. In an embodiment where non-visual sensory feedback comprises haptic feedback, an amount of haptic feedback provided to the user corresponds to a strength of the user. A given amount of force may feel too slight to a strong user and too great to a weak user. Thus, it may be preferable to determine the amount of haptic feedback to send to the user based on the strength of the user. This may be determined using known or estimated values for one or more of a velocity at which the user may move, the user's mass, and a force that the user exerts against a haptic feedback device.

Optional operation 910 depicts displaying the virtual object to the user via a three-dimensional (3-D) display. In an embodiment, the 3-D display comprises one of an active 3-D display and a passive 3-D display. An active 3-D display comprises use of additional moving technology beyond the display by the user, such as a pair of glasses that alternately exposes and closes a shutter in front of each eye. A passive display comprises use of static technology, such as a pair of glasses with one red lens and one blue lens used to view a stereoscopic image. The 3-D display may further comprise a display that requires no glasses or other technology beyond the display to view the 3-D image, such as a 3-D display that produces a hologram.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent from consideration of the specification disclosed herein. It is intended that the specification and illustrated implementations be considered as examples only.

What is claimed:

1. A system for providing non-visual sensory feedback to a user interacting with a virtual object, comprising:
   a capture device that captures data corresponding to a user location;
   a feedback device that provides non-visual sensory feedback to the user; and
   a component that predicts that a user is likely to interact with the virtual object at a future time based on at least a partial skeletal model of the user generated from the captured data; that, in response to initially predicting that the user is likely to interact with the virtual object at the future time, computes a non-visual sensory feedback for the predicted future interaction; and that indicates to the feedback device, prior to the future time, to provide the computed non-visual sensory feedback to the user at the future time.

2. The system of claim 1, further comprising:
   a three-dimensional (3-D) display that displays the virtual object to the user.

3. The system of claim 1 wherein the non-visual sensory feedback comprises haptic feedback or olfactory feedback.

4. The system of claim 3 wherein the virtual object corresponds to a second user interacting with the user across a communications network, and the feedback device that provides haptic feedback to the user further provides haptic feedback to the user corresponding to a haptic feedback received by the second user.

5. The system of claim 3 wherein the haptic feedback comprises one from a set, the set comprising haptic feedback produced by an ultrasonic wave, haptic feedback produced by a stream of air, and haptic feedback produced by a device coupled to the location of the user.

6. The system of claim 3 wherein providing haptic feedback to the user comprises:
   providing haptic feedback to the user at the location of the user.

7. The system of claim 1 wherein the component that determines that the location of the user corresponds to interacting with a virtual object, and that indicates to the feedback device to provide feedback to the user further:
   determines a characteristic of feedback to provide to the location of the user based on at least one quality of the user interaction with the virtual object.

8. The system of claim 7 wherein the quality of user interaction comprises a strength of the user, a task being completed, a velocity of the virtual object or the user, a mass of the virtual object or the user, or a material of the virtual object.

9. The system of claim 1 wherein the feedback device comprises at least one audio speaker, and non-visual sensory feedback comprises:
   directed audio from at least one audio speaker substantially centered on the user.

10. The system of claim 9 wherein a second user is present in a scene of the first user, and the directed audio is directed to the user such that it is understandable exclusively to the user.

11. A method for providing non-visual sensory feedback to a user interacting with a virtual object, comprising:
   receiving data captured by a capture device, the data reflecting a user location;
   predicting, based on the data, that a user is likely to interact with the virtual object at a future time based on at least a partial skeletal model of the user generated from the captured data;
   computing, prior to the future time, a non-visual sensory feedback for the predicted future interaction; and
   providing the computed non-visual sensory feedback to the user at the future user location at the future time.

12. The method of claim 11, further comprising:
   displaying the virtual object to the user via a three-dimensional (3-D) display, wherein the 3-D display is one from a set, the set comprising:
   an active 3-D display and a passive 3-D display.

13. The method of claim 11, wherein the non-visual sensory feedback is one from a set, the set comprising:
   haptic feedback, and olfactory feedback.

14. The method of claim 13, wherein an amount of haptic feedback corresponds to a strength of the user.

15. The method of claim 13, wherein a type of haptic feedback corresponds to one from a set, the set comprising:
   a velocity of the virtual object or the user, a mass of the virtual object or the user, and a material of the virtual object.

16. The method of claim 13, wherein the haptic feedback corresponds to Braille.

17. The method of claim 11, wherein the feedback corresponds to a task being completed.

18. The method of claim 11, wherein the location of the user corresponds to a representation on a display device and the virtual object is displayed on the display device.

19. A computer-readable storage medium excluding signals bearing computer-readable instructions that, when executed on a processor, cause the processor to perform operations comprising:
   displaying a virtual object to the user via a three-dimensional (3-D) display;
   receiving data captured by a capture device, the data reflecting a user location;
   predicting, based on the data, that a user is likely to interact with the virtual object at a future time based on at least a partial skeletal model of the user generated from the captured data;
   computing, prior to the future time, a non-visual sensory feedback for the predicted future interaction; and
   providing the computed non-visual sensory feedback to the user at the future user location at the future time.

* * * * *

UNITED STATES PATENT AND TRADEMARK OFFICE
CERTIFICATE OF CORRECTION

PATENT NO. : 8,009,022 B2  
APPLICATION NO. : 12/834723  
DATED : August 30, 2011  
INVENTOR(S) : Alex Kipman et al.

It is certified that error appears in the above-identified patent and that said Letters Patent is hereby corrected as shown below:

In column 12, line 46, after "wave" insert -- at --.

In column 12, line 48, after "air" insert -- at --.

Signed and Sealed this
Eighteenth Day of October, 2011

David J. Kappos
*Director of the United States Patent and Trademark Office*